United States Patent Office 3,425,958
Patented Feb. 4, 1969

3,425,958
PARTICULATE SILICA CONTACTED WITH A SILICIC ACID SOLUTION
Robert Paul Gentles, Linlithgow, Scotland, assignor, by mesne assignments, to British Hydrocarbon Chemicals Limited, London, England, a British company
No Drawing. Filed Dec. 12, 1966, Ser. No. 600,761
Claims priority, application Great Britain, Dec. 21, 1965, 54,009/65
U.S. Cl. 252—458        15 Claims
Int. Cl. B01j 11/06, 11/32

The present invention relates to a process for treating particulate silica to improve its handling properties.

Silica in particle form finds wide use in various technical fields in which the handling properties, in particular flow and fluidisation properties are important. Thus for example, silica in the form of particles is often used as a carrier on which various catalysts are deposited. An example of such a catalyst is chromium oxides which are deposited on silica and used to catalyse the polymerisation of olefines. In conventional practice this type of catalyst is activated by treating at elevated temperatures in a stream of oxygen containing gas, this operation being carried out with the catalyst fluidised in the gas stream. If the catalyst does not fluidise satisfactorily during this operation, it is difficult to produce catalysts of high and reproducible activity. With silicas having an average particle size below about 50 microns difficulties in fluidisation generally occur; silicas in the particle size range 50–150 microns usually fluidise satisfactorily.

The activated catalysts must be transported to the reactor system after activation, and this is usually done in fluid transport systems. Many catalysts give difficulty in these systems, and difficulties have been found even with catalysts having average particle sizes within the range 50–100 microns which can be readily fluidised in the activation step. In the polymerisation reactors the catalyst is fed typically as a slurry or in some cases dry, and must be dispersed in the reaction medium as uniformly as possible to give the best results. With catalysts of poor flow properties difficulties are also met with in feeding and metering the catalyst into the reactor. In carrying out for example the reaction without solvent, it has also been proposed to maintain the catalyst fluidised in the gaseous monomer, and clearly this requires satisfactory fluidising properties.

Catalysts of particle size below about 50 microns usually give trouble in transport systems and in dispersing in the reactor, and also prove very difficult to remove by centrifuging or filtration from the polymer solution formed in solution polymerisation. In general, the extent to which these difficulties occur depend not only on the particle size of the catalyst, but also to some extent on the type of operation and equipment used, and on other properties of the catalyst such as bulk density and the degree of uniformity in size and shape of the particles. Two common types of difficulty are the formation of a plug of catalyst which then is moved bodily instead of as individual particles (blocking) and the formation of static portions of catalyst which allow the passage of air but interfere with fluidisation or smooth flow in transport equipment (bridging).

The handling problems referred to above make the use of some finely divided silicas which otherwise have desirable properties, difficult or impossible. A method of improving the handling properties of particulate silicas which did not destroy their valuable properties would be highly advantageous.

According to the present invention a process for improving the flow properties of particulate silica comprises the steps of bringing the silica into contact with a solution of silicic acid in a solvent and removing the solvent from the particulate silica.

The present invention is also a process for fluidising particulate silica which comprises the steps of bringing the particulate silica into contact with a solution of silicic acid and removing the solvent from the particulate silica before fluidising the particulate silica. The present invention is also a process for the production of a supported catalyst which comprises a catalyst deposited on a particulate silica carrier wherein the particulate silica carrier is brought into contact with a solution of silicic acid, and the solvent is then removed from the carrier.

The particulate silica with which the present invention is concerned is to be distinguished from silicic acid, i.e. silica sols, which also may be said to contain silica particles. The silica particles in these sols are generally small, as otherwise they would not remain in the colloidal state, and removal of water from the sol generally leads to the formation of a gel, and not the production of discrete particles. The particulate silicas with which the present invention is concerned are those which are particulate in the solid state such as the Davison "Sylloid" 244 and Crosfield "Gasil" silica powder exemplified in the specification.

The silicas with which the process of the present invention shows a particular improvement in handling properties are those having an average particle size in the approximate range 1 to 100 microns, especially those in the range 1 to 50 microns.

Silicic acid solutions may be prepared by known methods e.g. by passing sodium silicate solutions through a cation exchange resin in the hydrogen form. A silicic acid sol free from cations is thereby formed. The silicic acid solutions are generally colloidal sols which probably contain low molecular weight polymers of the structural unit

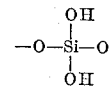

where the silicic acid is to be used to treat a silica to be used as a support for a transition metal oxide polymerisation catalyst, the absence of cations is essential as these would poison the catalyst.

Although the silicic acid solutions used in the present invention may often be colloidal sols rather than true solutions, the term "silicic acid solution" as used in this specification includes both sols and true solutions.

In the same way the term solvent as used in this specification for the medium in which the "silicic acid solution" is prepared includes both liquids in which true solutions are formed, and liquids which could be considered to be dispersion mediums. The solvent is most suitably water. The solvent may be removed from the particulate silica in any convenient manner. Thus the removal of the solvent, in which the "silicic acid solution" is prepared, from the silica may conveniently be carried out by heating the mixture of particulate silica and silicic acid solution.

The quantity of silicic acid solution brought into contact with the particulate silica may vary within moderately wide limits. The quantity of silicic acid brought into contact with the particulate silica is preferably sufficient to increase the weight of the particulate silica by between 1 and 25% after removal of the solvent.

The silicic acid treatment of the present invention may be applied to any particulate silica with which difficulties in handling are obtained. The fluidisation with which the present invention is concerned includes dispersing the silica particles in a gas stream to form a fluidised bed. The term fluidisation also includes any other operation in which the solvent-free particles are caused to flow. Any of the known fluidisation conditions may be used in the process of the present invention. Where the silica is to be used as a catalyst support the catalyst may be deposited on the silica at the same time as the treatment with silicic acid is carried out, providing the two processes are compatible. Alternatively, the deposition of the catalytic material on to the silica support may precede or follow the treatment with the silicic acid.

The process of the present invention is particularly advantageous for the preparation of olefine polymerisation catalysts having improved handling properties, by the deposition of transition metal compounds on the silica simultaneously with treatment with silicic acid. The transition metal compounds are preferably oxides or compounds which can be converted into oxides by heating in gases containing molecular oxygen. Examples of suitable transition metal compounds are those of chromium which preferably are compounds which on heating in gases containing molecular oxygen leave chromium oxides at least part of which are in the Cr(VI) oxidation state. A suitable chromium compound is chromium trioxide ($CrO_3$).

It is often desirable when catalysts have been deposited on particulate silica carriers to activate the catalysts by heating them. It is convenient to carry out the activation by dispersing the catalyst particles as a fluid bed in a heated gas stream, which often contains molecular oxygen. The gas may then suitably be air. The catalysts treated with silicic acid solution in accordance with the present invention fluidise more readily and are therefore activated more satisfactorily than those which have not been treated.

When the process of the present invention is applied to the preparation of transition metal oxide catalysts for the polymerisation of olefines, the resulting catalysts not only have better flow properties, e.g. fluidise more readily, but show a higher activity. The resulting polymer is generally very similar to that produced by catalysts which did not have a silicic acid treatment, though the amount of change in polymer properties produced by silicic acid treatment may well depend on the nature of the silica base.

Some catalysts comprising chromium(VI) oxides deposited on finely divided silica when used to polymerise olefines e.g. ethylene give low shear response polymer when used in solution polymerisation and give readily processible polymers whose high load melt index is high in particle form polymerisations in which the polymerisation is carried out in a dispersion medium which is not a solvent for the polymer.

Melt index is measured using the Extrusion Plastometer of ASTM D1238 57T the low load melt index (MI 2.16) being determined using a load of 2.16 kg. (Method E) and the high load melt index (MI 21.6) being determined using a load of 21.6 kg. (Method F). The Melt Index ratio is the ratio of high load melt index to low load melt index (MI 21.6/MI 2.16) and is a measure of shear response which is the variation of viscosity of the polymer with rate of shear. A low shear response is indicated by a low melt index ratio. Polymers produced by particle form polymerisations are generally of very high molecular weight and low melt-index, and the molecular weight cannot be lowered by the conventional means of raising the polymerisation temperature because of the difficulties in operating the process which then arise. The high molecular weight low melt index polymers produced by this type of process have been difficult to process. It is therefore very advantageous to be able to use catalysts capable of giving a high melt index polymer.

In solution polymerisation catalysts comprising chromium(VI) oxide on certain finely divided silica supports can polymerise olefines e.g. ethylene to give polymers having a low shear response, which is desirable e.g. in order to prevent warpage in articles produced by injection moulding.

Prior art catalysts giving low melt index and shear response as referred to above had the disadvantages that they were generally difficult to handle. This disadvantage is removed by the treatment with silicic acid in accordance with the present invention.

The invention will now be further illustrated by reference to the following examples.

EXAMPLES

The following experimental details were common to all the examples.

(A) Preparation of silicic acid solution

Aqueous sodium silicate (water glass) was used in these preparations, a product made by Joseph Crosfields having the following analysis being used in these examples:

S.G. (20°/20° C.) _____ 1.42
$SiO_2/NA_2O$ ratio _____ 3.2:1
$SiO_2$ content, wt. percent _____ 30.1
$Na_2O$ content, wt. percent _____ 9.4

For ion exchange this water glass was diluted with approximately twenty times its volume of distilled water.

A cross-linked sulphonated polystyrene resin (Zeocarb 225) was used for ion exchange, approximately 500 g. of the damp resin being packed into a glass column 60 cm. long by 35 cm. in diameter. The diluted water glass solution was passed through this column at 250 ml./hour, the column charge sufficing to deionise approximately 500 ml. of the original undiluted water glass. After each run the column was regenerated by passing about 500–600 ml. of 2 N aqueous hydrochloric acid through the bed over 10–15 minutes, and then washing with distilled water (about 2 litres) until the effluent was free of chloride.

(B) Preparation of polymerisation catalyst

In these preparations approximately 50 g. of the silica base was used. Chromium trioxide in the amount required for the catalyst impregnation was dissolved in the silicic acid solution. The catalyst base was then added and the mixture heated with stirring on a hot-plate to remove the solvent i.e. water until a dry powder was obtained. Any other catalyst additive required, such as ammonium silicofluoride, was also dissolved in the silicic acid solution. The catalysts were all activated at the temperature indicated by fluidising in an air stream.

(C) Solution and particle-form olefine polymerisation conditions

The catalysts prepared as above together with other catalysts made using silica bases not treated with silicic acid were tested by using them to carry out batch polymerisations of ethylene in a conventional stirred reactor. Solution polymerisation tests were carried out in cyclohexane at 125–130° C. Particle form polymerisations were carried out in pentane at 100° C.

Example 1.—Five catalysts were prepared in accordance with the present invention by the methods given above from Davison Sylloid 244 silica, having an average particle diameter of about 3 microns. The pore size distribution was determined for each catalyst and test solution and particle form polymerisations were carried out.

Example 2.—In a comparative example, not according to the invention, catalysts were prepared as in Example 1 but without any silicic acid treatment. The same tests were carried out as in Example 1 and the results from Examples 1 and 2 are combined in Tables 1 and 2.

TABLE 1.—EFFECT ON PORE SIZE DISTRIBUTION OF SILICIC ACID TREATMENT OF SYLLOID 244

[Chromium content of all catalysts=2% wt. of $CrO_3$]

| Catalyst No. | Catalyst preparation | | | Catalyst surface area, (BET. $M^2g$.) | Percent of surface area in pores of diameter ranges shown (A.) | | | | |
|---|---|---|---|---|---|---|---|---|---|
| | Percent added silicic acid [1] | Percent added $(NH_4)_2SiF_6$ | Actn. Temp., °C. | | 0-100 | 100-200 | 200-300 | 300-400 | 400 |
| 615 | 25 | ([2]) | 750 | 241 | 122 | 28 | 40 | 15 | 5 |
| 621 | 25 | ([2]) | 750 | 238 | 5 | 25 | 35 | 27 | 8 |
| 634 | 2.5 | ([2]) | 550 | 255 | 8 | 22 | 32 | 28 | 10 |
| 629 | 25 | 0.5 | 550 | 241 | 10 | 25 | 35 | 23 | 7 |
| 633 | 2.5 | 0.5 | 550 | 246 | 9 | 25 | 42 | 19 | 4 |
| | ([2]) | ([2]) | 550 | 264 | 19 | 33 | 39 | 9 | ----- |

[1] Percent added silicic acid measures the increase in weight of the catalyst, due to the treatment with silicic acid, after removal of the solvent.
[2] Nil.

The addition of sufficient silicic acid solution to increase the weight of the catalyst after removal of the solvent, by 25% by weight based on the silica support does not substantially change the surface area or the pore size distribution of the resulting catalyst, compared with that made from the untreated base. This is illustrated by the results obtained in Table 1 using Davison Sylloid 244 silica as catalyst base.

TABLE 2.—BENCH REACTOR HOMOPOLYMERISATIONS WITH SILICIC ACID MODIFIED SYLLOID BASED CATALYSTS

[Chromium content of all catalysts=2%]

| Catalyst No. | Solution process homopolymerisation at 125-130° C. | | | Particle form homopolymerisation at 100° C. | |
|---|---|---|---|---|---|
| | Polymer formation rate, g./g. cat./hr. | Polymer properties | | Polymer formation rate, g./g. cat./hr. | High load Melt Index $MI_{21.6}$ |
| | | Low load Melt Index $MI_{2.16}$ | Melt Index ratio | | |
| 615 | 541 | 9 | 27 | 890 | 8.4 |
| 621 | 417 | 18 | 26 | 292 | 15.0 |
| 634 | 285 | 5 | 32 | 226 | 2.0 |
| 629 | 379 | 6 | 29 | 333 | 1.3 |
| 633 | 474 | 11.5 | 28 | 452 | 6.0 |

With 2.5% of added silicic acid the catalyst fluidised much better during activation than with no silicic acid, although the behaviour was still not completely satisfactory. With 25% of added silicic acid fluidisation was perfectly satisfactory. The untreated Sylloid based catalysts were very difficult to fluidise during activation, and catalyst of high and reproducible activity were difficult to make from the untreated base. The treated catalysts all showed satisfactory activities in both solution and particle form polymerisations.

Example 3.—Five further catalysts were prepared in accordance with the invention from Davison Sylloid 244 silica. The catalysts were tested in the solution polymerisation of ethylene. The conditions of the catalyst preparation and the results obtained are given in Table 3.

Example 4.—A polymerisation catalyst was prepared in accordance with the present invention from Gasil 23, a finely powdered silica having an average particle diameter of 2-3 microns and a very uniform particle size made by Joseph Crosfield Ltd. The untreated silica did not fluidise readily. The catalyst was used in the solution polymerisation of ethylene after being activated by fluidisation in a heated air stream.

Example 5.—In a comparative example, not according to the invention, a polymerisation catalyst was prepared as in Example 4, but without the silicic acid treatment step, and used for the solution polymerisation of ethylene. The results of Examples 4 and 5 are shown in Table 4.

TABLE 4.—SOLUTION POLYMERISATIONS WITH GASIL 23 BASED CATALYSTS

| Catalyst preparation conditions | | |
|---|---|---|
| Chromium content, as weight percent $CrO_3$ | 1.0 | 1.0 |
| Weight percent added silicic acid (as $SiO_2$) | Nil | 10.0 |
| Weight percent added ammonium fluosilicate | 2.0 | 2.0 |
| Activation temperature, ° C. | 550 | 550 |
| Catalyst No. | 542 | 702 |
| Polymerisations: | | |
| Run No. | 3020C | 3491D |
| Mean polymerisation temperature, ° C. | 125 | 127 |
| Rate, gm. polymer/g. catalyst/hour | 116 | 437 |
| Polymer Melt Index Data: | | |
| Melt Index, $MI_{2.16}$ | 6.1 | 3.1 |
| Melt Index, $MI_{2.16}$ | 178 | 152 |
| Melt Index ratio | 29.4 | 48.8 |

The gain in catalyst activity through addition of silicic acid is again clear, for the same reasons as with the Sylloid catalyst. It should be realised with these examples that the untreated Sylloid and Gasil based catalysts were very difficult to reproduce and repeat experiments tended to give very divergent results. In all cases however, much more satisfactory and consistent activations and polymerisations were obtained with the silicic acid treated catalysts, and catalyst activities were better than the best obtained with untreated bases.

I claim:
1. A process for improving the flow properties of particulate silica which comprises the steps of bringing the silica into contact with a solution of silicic acid in a solvent and removing the solvent from the particulate silica.

TABLE 3.—SOLUTION POLYMERISATION WITH SYLLOID 244 BASED CATALYSTS

| Catalyst No. | Catalyst preparation conditions | | | | Run No. | Mean Polymn. Temp., ° C. | Rate, g./gm./hr. | Polymer melt Index | | |
|---|---|---|---|---|---|---|---|---|---|---|
| | Percent $CrO_3$ | Percent added silicic acid (as $SiO_2$) | Percent added $(NH_4)_2SiF_6$ | Actn. temp., ° C. | | | | $MI_{2.16}$ | $MI_{21.6}$ | MI ratio |
| 438 | 2.0 | ([1]) | 2.0 | 500 | 2580C | 131 | 156 | 8.8 | 232 | 26.5 |
| 438 | 2.0 | ([1]) | 2.0 | 500 | 2531C | 127 | 212 | 7.7 | 221 | 28.5 |
| 634 | 2.0 | 2.5 | ([1]) | 550 | 3322C | 125 | 285 | 4.6 | 148 | 32.0 |
| 629 | 2.0 | 25.0 | 0.5 | 550 | 3304C | 127 | 379 | 6.1 | 178 | 29.4 |
| 633 | 2.0 | 2.5 | 0.5 | 550 | 3317C | 130 | 474 | 11.5 | 328 | 28.4 |

[1] Nil.

These results and those of Table 2 above indicate a significant improvement in catalyst activity through addition of silicic acid. This improvement was mainly due to the better fluidisation of the catalyst during activation, with resulting better control of the activation conditions. Clearly the silica treatment does not significantly reduce one of the major advantages of this catalyst, which is the ability to produce low shear response (i.e. low melt index ratio) polymers.

culate silica which comprises the steps of bringing the silica into contact with a solution of silicic acid in a solvent and removing the solvent from the particulate silica.

2. A process for improving the fluidising properties of particulate silica which comprises the steps of bringing the particulate silica into contact with a solution of silicic acid and removing the solvent from the silica before fluidising the particulate silica.

3. A process for the production of a supported catalyst comprising a catalyst deposited on a particulate silica carrier wherein the particulate silica carrier is brought into contact with a solution of silicic acid, and the solvent is removed from the silica.

4. A process according to claim 3 wherein the catalyst deposited on the silica is a transition metal compound.

5. A process according to claim 4 wherein the transition metal compound is deposited on the silica at the same time as the silica is brought into contact with the silicic acid solution.

6. A process according to claim 4 wherein the transition metal compound is chromium trioxide.

7. A process according to claim 1 wherein the particulate silica has an average particle size in the range 1 to 100 microns.

8. A process according to claim 1 wherein the particulate silica has an average particle size in the range 1 to 50 microns.

9. A process according to claim 1 wherein the silicic acid solution is a solution in water.

10. A process according to claim 1 whereafter the particulate silica has been brought into contact with the silicic acid, the solvent is removed by heating.

11. A process according to claim 2 wherein the silicic acid is substantially free from cations.

12. A process according to claim 3 wherein the catalyst is activated by fluidising the catalyst after the particulate silica carrier has been brought into contact with the solution of silicic acid and the solvent has been removed from the particulate silica.

13. A process according to claim 12 wherein the catalyst is activated by fluidising the catalyst in a stream of oxygen-containing gas.

14. A process according to claim 13 wherein the oxygen-containing gas is air.

15. A process according to claim 2 wherein the quantity of silicic acid brought into contact with the particulate silica is sufficient to increase the weight of the particulate silica by between 1% and 25% after removal of the solvent.

References Cited

UNITED STATES PATENTS

| | | | |
|---|---|---|---|
| 1,649,405 | 4/1924 | Herrmann et al. | 252—451 |
| 1,952,057 | 3/1934 | Crawford et al. | 252—451 X |
| 3,089,902 | 5/1963 | Vitcha et al. | 252—451 X |
| 3,281,405 | 10/1966 | Hogan | 252—458 X |
| 3,284,369 | 11/1966 | Bergna et al. | 252—458 X |

DANIEL E. WYMAN, *Primary Examiner.*

CARL F. DEES, *Assistant Examiner.*

U.S. Cl. X.R.

252—449, 451